United States Patent
Henning et al.

(10) Patent No.: US 9,403,554 B2
(45) Date of Patent: Aug. 2, 2016

(54) ROTATION ANGLE SENSOR, IN PARTICULAR STEERING ANGLE SENSOR FOR A STEERING UNIT

(75) Inventors: Dennis Henning, Flensburg (DE); John Kristensen, Sønderborg (DK); Soeren Moeller Hansen, Sydals (DK)

(73) Assignee: Danfoss Power Solutions ApS, Nordborg (DK)

( * ) Notice: Subject to any disclaimer, the term of this patent is extended or adjusted under 35 U.S.C. 154(b) by 922 days.

(21) Appl. No.: 12/636,936

(22) Filed: Dec. 14, 2009

(65) Prior Publication Data

US 2010/0147060 A1    Jun. 17, 2010

(30) Foreign Application Priority Data

Dec. 17, 2008  (DE) .......................... 10 2008 062 416

(51) Int. Cl.
*G01M 17/06* (2006.01)
*B62D 15/02* (2006.01)

(52) U.S. Cl.
CPC .................................. *B62D 15/0215* (2013.01)

(58) Field of Classification Search
CPC ....................................................... G01M 17/06
USPC ...................................................... 73/117.02
See application file for complete search history.

(56) References Cited

U.S. PATENT DOCUMENTS

| | | | |
|---|---|---|---|
| 4,994,739 A | 2/1991 | Honda et al. | |
| 5,218,769 A * | 6/1993 | Tranchon | 33/1 PT |
| 5,585,560 A | 12/1996 | Goossens | |
| 5,971,782 A * | 10/1999 | Masuda | 439/164 |
| 6,144,027 A | 11/2000 | Weber | |
| 6,246,232 B1 * | 6/2001 | Okumura | 324/207.2 |
| 6,271,515 B1 * | 8/2001 | Matsumoto | 250/239 |
| 6,862,926 B2 * | 3/2005 | Mukaiyama | 73/114.26 |
| 6,983,647 B2 * | 1/2006 | Nagaoka et al. | 73/117.02 |
| 7,030,608 B2 | 4/2006 | Kawashima et al. | |
| 7,142,433 B2 | 11/2006 | Lechner | |
| 7,322,115 B2 * | 1/2008 | Besier et al. | 33/1 PT |
| 7,424,858 B2 * | 9/2008 | Matsuda et al. | 114/144 E |
| 7,445,451 B2 * | 11/2008 | Tanaka et al. | 439/15 |
| 7,463,019 B2 | 12/2008 | Kaltenbach et al. | |
| 7,726,208 B2 * | 6/2010 | Hoeller et al. | 73/862.331 |
| 7,758,363 B2 * | 7/2010 | Tanaka et al. | 439/164 |

(Continued)

FOREIGN PATENT DOCUMENTS

| | | | |
|---|---|---|---|
| DE | 2755467 A1 | 6/1978 | |
| DE | 19723430 A1 | 1/1998 | |

(Continued)

OTHER PUBLICATIONS

MMT/Melexis Preliminary Development Note entitled, "Through Shaft 360° Magnetic Rotary Position Sensor", 1 page, undated.

*Primary Examiner* — Eric S McCall
(74) *Attorney, Agent, or Firm* — McCormick, Paulding & Huber LLP

(57) ABSTRACT

The invention concerns a rotation angle sensor, in particular a steering angle sensor (1) for a steering unit, with a housing (2) comprising an exterior (8), a pick-up sensor (7) arranged in a sensor chamber in the housing (2) to perform rotary movements around a rotation axis, and a stationary receiver interacting with the pick-up sensor (7). It is endeavored to make such steering angle sensors fit for rough environmental conditions. For this purpose, the sensor chamber is connected to the exterior (8) via at least one free space (16).

13 Claims, 3 Drawing Sheets

(56) References Cited

U.S. PATENT DOCUMENTS

| | | |
|---|---|---|
| 2002/0059838 A1* | 5/2002 | Nagaoka et al. ......... 73/862.328 |
| 2003/0019113 A1* | 1/2003 | Kofink et al. ................. 33/1 PT |
| 2003/0167858 A1* | 9/2003 | Terui et al. ............... 73/862.333 |
| 2005/0109089 A1* | 5/2005 | Nagaoka et al. ............. 73/118.1 |
| 2006/0146860 A1* | 7/2006 | Suzuki et al. ................. 370/441 |
| 2008/0003853 A1* | 1/2008 | Tanaka et al. ................. 439/164 |
| 2008/0009993 A1* | 1/2008 | Matsuda et al. ................ 701/41 |
| 2008/0127755 A1 | 6/2008 | Kim |
| 2010/0235054 A1* | 9/2010 | Hoskins et al. ................. 701/42 |
| 2011/0067981 A1* | 3/2011 | Kusama .................... 200/61.54 |

FOREIGN PATENT DOCUMENTS

| | | |
|---|---|---|
| DE | 19922215 A1 | 11/2000 |
| DE | 10 2004 018 869 A1 | 3/2005 |
| EP | 0 185 638 A2 | 6/1986 |
| EP | 1 070 654 A2 | 1/2001 |
| EP | 1 533 212 A1 | 5/2005 |
| GB | 1 566 006 A | 4/1980 |
| JP | 2003294409 A | 10/2003 |
| WO | 2007057563 A1 | 5/2007 |
| WO | 2008039837 A2 | 4/2008 |

* cited by examiner

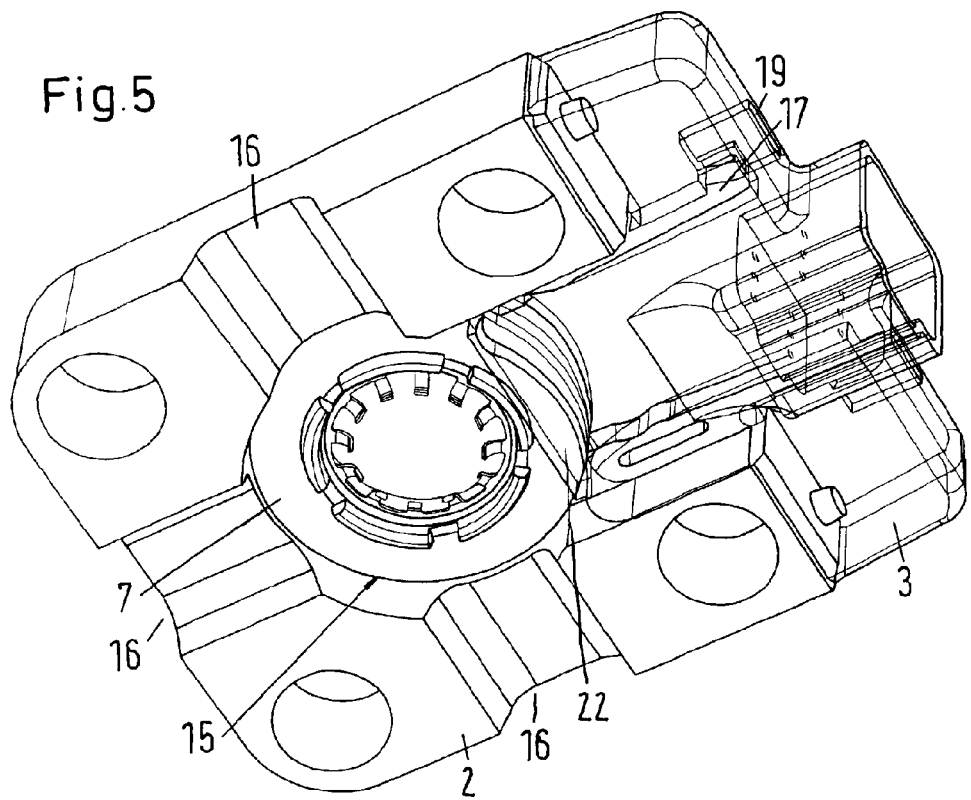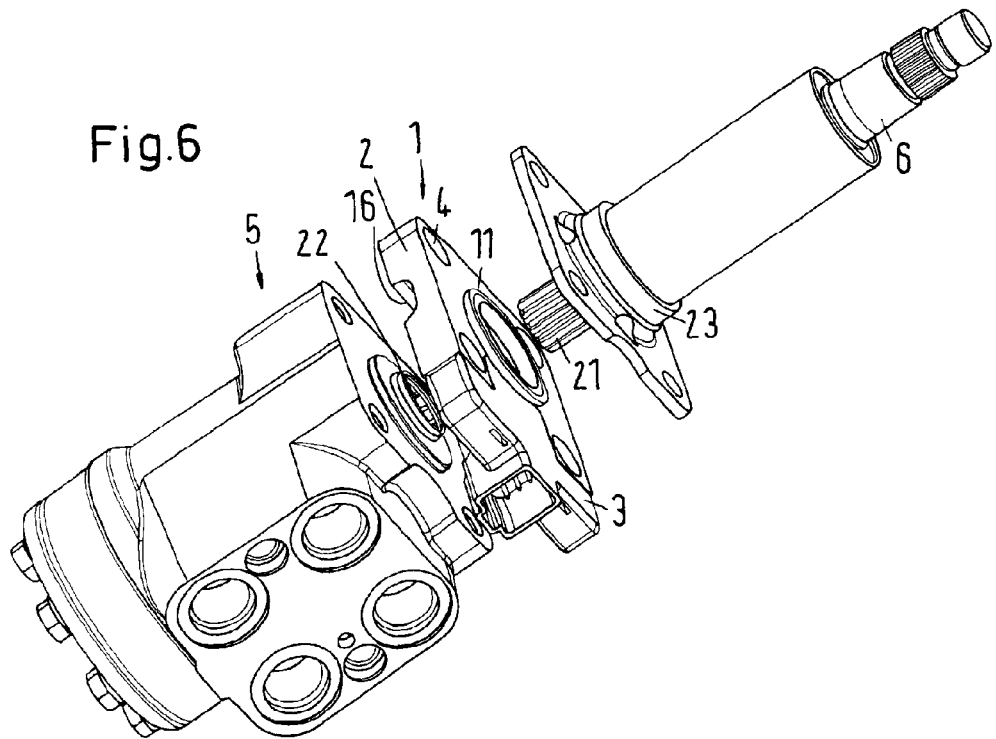

ROTATION ANGLE SENSOR, IN PARTICULAR STEERING ANGLE SENSOR FOR A STEERING UNIT

CROSS REFERENCE TO RELATED APPLICATION

Applicant hereby claims foreign priority benefits under U.S.C. §119 from German Patent Application No. 10 2008 062 416.0 filed on Dec. 17, 2008, the contents of which are incorporated by reference herein.

FIELD OF THE INVENTION

The invention concerns a rotation angle sensor, in particular a steering angle sensor for a steering unit, with a housing comprising an exterior, a pick-up sensor arranged in a sensor chamber in the housing to perform rotary movements around a rotation axis, and a stationary receiver interacting with the pick-up sensor.

BACKGROUND OF THE INVENTION

Such a sensor, which can also be used as a steering angle sensor, is known from, for example, U.S. Pat. No. 5,585,560.

In the following, the invention is explained on the basis of a steering angle sensor. However, it is not limited to such an application.

In a hydraulic steering unit, a steering angle, for example, serves the purpose of detecting the angle position of a steering handwheel, which is necessary for many steering purposes, in particular in vehicles, which have to work under rough environmental conditions. Such vehicles are, for example, building site vehicles, agricultural vehicles, mining vehicles or the like. The working environment of these vehicles is to a high extent loaded with dust. There is a continuous risk that the dust will penetrate into the steering angle sensor, which could, under unfavourable conditions, cause that the steering angle is damaged. In this case, the steering angle sensor has to be dismounted and at least partly replaces, which requires a substantial amount of time and work.

SUMMARY OF THE INVENTION

The invention is based on the task of providing a steering angle sensor, which is also suited for rough environmental conditions.

With a steering angle sensor as mentioned in the introduction, this task is solved in that the sensor chamber is connected to the exterior via at least one free space.

In this connection, the following is assumed: the attempts that have been made until now to keep the dust out of the rotation angle sensor, have only had a limited success. It is relatively difficult to seal moving parts in relation to each other in such a manner that the penetration of dust is reliably prevented. It can be ensured that the penetration of dust is made difficult. When, however, dust has penetrated into the sensor chamber, it will be retained there by the measures taken to prevent its penetration in the first place. It gathers there. After some hundreds or thousands of operation hours, the steering angle may contain so much dust that further movements will cause the dust to damage the steering angle sensor. If, however, the sensor chamber is connected to the environment via a free space, dust or other impurities are permitted to penetrate into the steering angle sensor. However, the dust is not caught in the sensor chamber, but is carried out of the sensor chamber again through the free space. Over the time, a certain degree of contamination will occur. As, however, this degree of contamination will only have a slight negative influence on the working ability of the steering angle sensor, it can be accepted. The use of an open sensor chamber does away with the method that has been used until now in connection with rough environmental conditions, namely the use of an increasingly complicated encapsulation.

Preferably, the free space is made as a channel extending transversely to the rotation axis. The channel does not have to be exactly rectangular in relation to the rotation axis. It must merely be ensured that the channel extends approximately radially from the inside to the outside, so that the dust or other impurities that have penetrated into the sensor chamber can be displaced to the outside again during a rotation of the pick-up sensor.

Preferably, the free space has a cross-section, whose extension tangentially to the pick-up sensor amounts to at least 25% of the largest diameter of the pick-up sensor. When the pick-up sensor has the form of a cylinder-shaped rotor, there is of course only one diameter. When the free space has an accordingly large extension in the circumferential direction, impurities having entered the sensor chamber can easily escape again.

Preferably, the free space has a cross-section, whose extension in parallel to the rotation axis amounts to at least 25% of the extension laterally to the rotation axis. Thus, the free space has a certain "height", so that entered impurities can relatively easily escape. Expediently, the free space should extend to a height, at which the pick-up sensor is arranged.

Preferably, the receiver is arranged in a hermetically enclosed unit, which is detachably connected to the housing. When the receiver has an error and has to be replaced, the unit merely has to be detached from the housing and replaced. With a detachable connection, this is possible without problems. As the unit is hermetically enclosed, it cannot be damaged by dust or other impurities. At least they cannot penetrate into the inside.

Preferably, the unit is connected to the housing by means of a snap connection. A snap connection is easily established and also easily detached again. With the conditions ruling at a steering unit, it is sufficiently stable.

It is preferred that the snap connection has at least one snap hook, which is accessible from the side of the unit facing away from the housing. The unit can also be removed from the housing, when the steering angle sensor is assembled with a steering unit.

Preferably, the unit projects at least partly into the sensor chamber. Thus, a good active connection between the receiver in the unit and the pick-up sensor in the sensor chamber can be achieved. As impurities, which have been carried into the sensor chamber, can also escape from there again, it is not a problem to let a part of the unit project into the sensor chamber.

Preferably, the pick-up sensor is arranged on a retaining ring that rests on an axial bearing surface on the outside of the housing. The pick-up sensor can, for example, be connected to the retaining ring by means of a snap connection. Such a snap connection provides a form-fit in the axial direction, which is, however, detachable. In the circumferential direction, the pick-up sensor is held on the retaining ring by friction. This is a relatively simple way of connecting the pick-up sensor in a rotationally movable manner to the housing.

Preferably, the housing has a projection surrounding the axial bearing surface. Thus, the retaining ring is protected on the side, on which it projects over the housing.

It is preferred that in the axial direction the projection has the same length as the part of the retaining ring resting on the outside of the axial bearing surface. In the ideal case, the end of the retaining ring and of end the projection then flush with each other. However, deviations of a few millimeters may exist.

Preferably, the retaining ring has an opening for the accommodation of a steering handwheel shaft, spring fingers projecting into said opening. These spring fingers can then engage a toothing, which is available on the steering handwheel shaft anyway, to make the steering handwheel shaft engage the steering unit.

Preferably, the pick-up sensor is a magnetic pick-up sensor. In this connection, a magnetised ring can be concerned, on whose circumferential side magnetic poles are arranged to be alternating, or which is magnetised in the diameter direction. The receiver is then made as a magnetic sensor, for example a Hall-sensor.

Preferably, a purification device is arranged in the sensor chamber, which can be activated by the pick-up sensor. With the purification device, dust or other impurities can be transported to the free space or free spaces, from where they can escape from the sensor chamber.

BRIEF DESCRIPTION OF THE DRAWINGS

In the following, the invention is described on the basis of a preferred embodiment in connection with the drawings, showing.

DETAILED DESCRIPTION OF THE PREFERRED EMBODIMENTS

Figure 1:
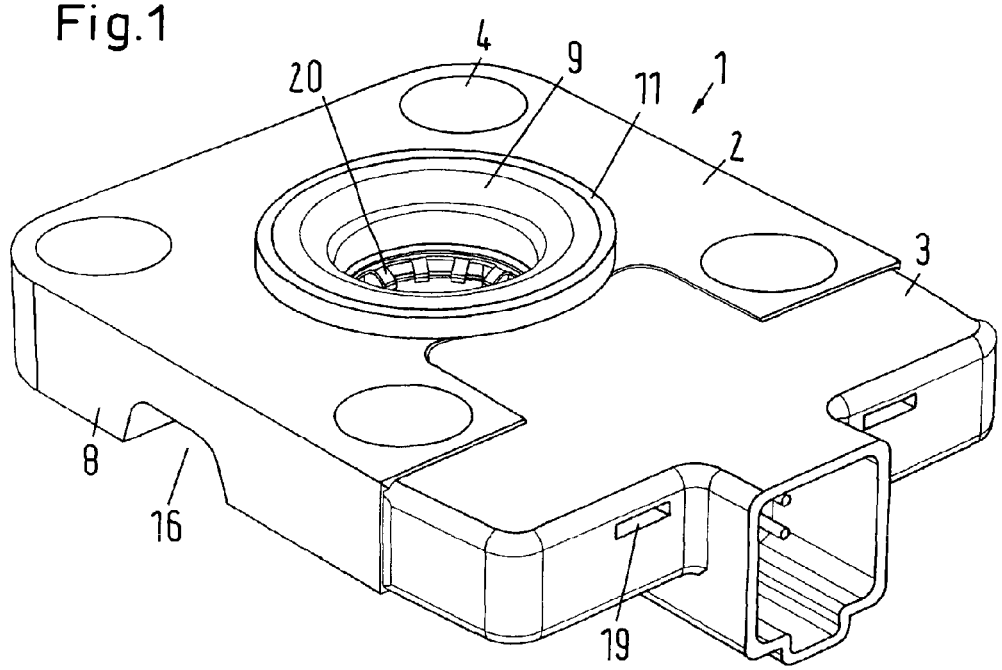
FIG. 1 a steering angle sensor in a perspective view,
FIG. 2 the steering angle sensor in an exploded view,
FIG. 3 the steering angle sensor with dismounted unit,
FIG. 4 inclined bottom view of the steering angle sensor
FIG. 5 a view according to FIG. 4 with the unit being partly transparent, and
FIG. 6 the steering unit during assembly with a steering unit.

FIG. 1 shows a steering angle sensor 1 with a housing 2, at which a unit 3 is arranged. The housing has a total of four through holes 4, through which bolts can be guided to connect the steering angle sensor 1 to a steering unit 5 and a steering handwheel shaft 6 (FIG. 6).

The steering angle sensor has (FIG. 2) a pick-up sensor 7 in the form of a ring, which is either provided with permanent magnets or permanently magnetised itself. In this connection, magnetic poles succeed each other in the circumferential direction. Also a magnetic ring with a bipolar magnetising or a ring that has been magnetised over its diameter can be used. The unit 3 can then comprise one or more magnetic sensors, for example Hall-sensors, which are adjacent to the pick-up sensor 7 and detect the radial or axial components of the magnetic field in order to determine a rotation angle position of the pick-up sensor 7. Instead of a magnetic pick-up sensor, also other pick-up sensors are of course possible. The receiver in the unit 3 must then be adjusted accordingly.

The housing 2 has an outside 8 that extends in parallel to the axis of the bore 4. In the assembled state, this outside is free to access.

The pick-up sensor 7 is arranged on a retaining ring 9. The retaining ring 9 bears on an axial bearing surface 10 of the housing 2. This axial bearing surface 10 is surrounded by a circumferential projection 11, whose end flushes approximately with the projection 11, when the retaining ring 9 rests on the axial bearing surface 10.

The retaining ring 9 has first snap hooks 12, which are distributed in the circumferential direction and project radially outwards. With these first snap hooks 12; the retaining ring 9 is fixed in the housing 2 in the axial direction. For this purpose, the first snap hooks 12 engage behind a surface on a front wall 13 of the housing 2, which lies opposite the axial bearing surface 10.

The retaining ring 9 has second snap hooks 14, which engage behind the pick-up sensor 7, so that the pick-up sensor 7 is clamped on the retaining ring. The second snap hooks 14 cause an axial retaining of the pick-up sensor 7 on the retaining ring 9. The pick-up sensor 7 is fixed on the retaining ring 9, when the retaining ring 9 is arranged in the housing 2 and locked in place there.

Instead of the snap connections described, it may also be ensured that the pick-up sensor 7 is moulded together with the retaining ring 9. The pick-up sensor 7 and the retaining ring 9 can also be made in two or more pieces, so that they can also be mounted around and dismounted from the rotation axis, when a mounting in the axial direction is not possible.

Figure 3:
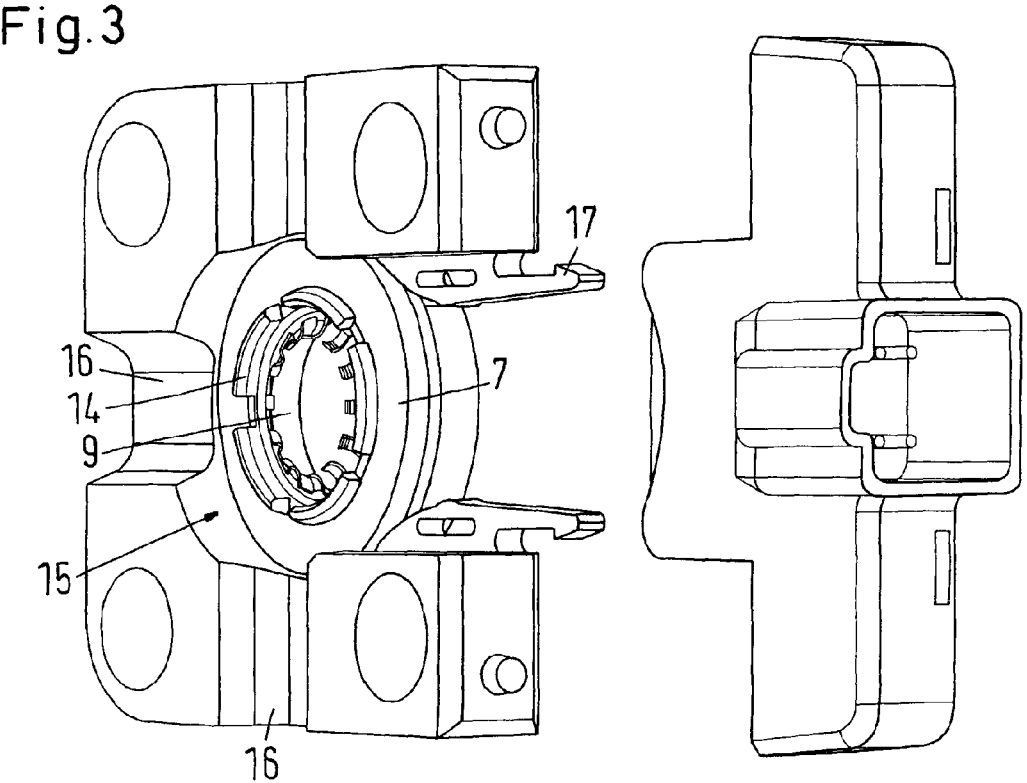
Figure 4:
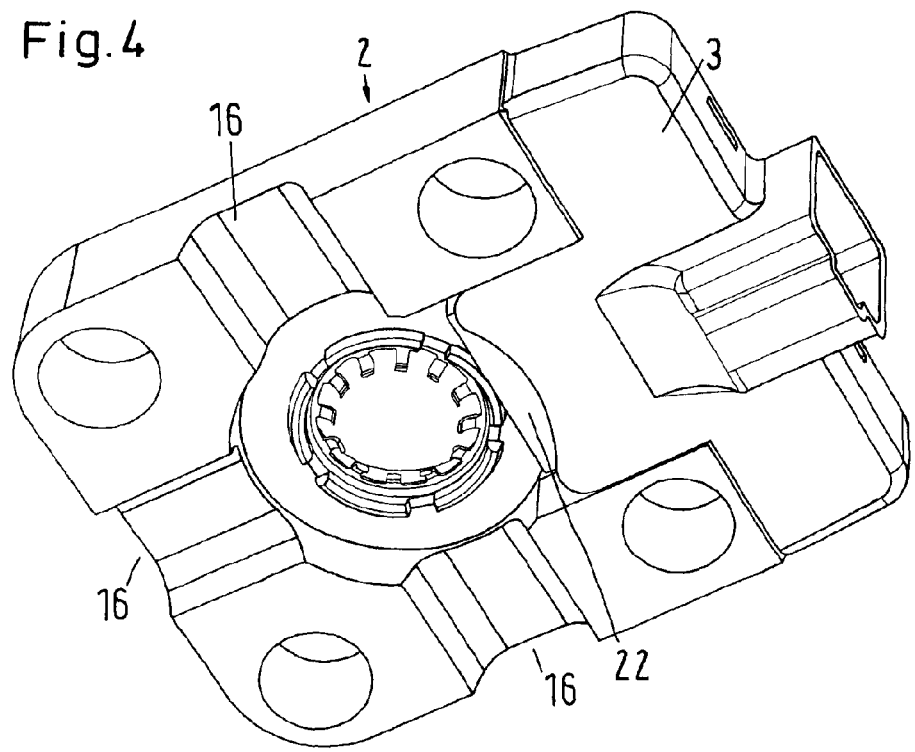

As can be seen, particularly from the FIGS. 3 to 5, the housing 2 comprises a sensor chamber 15, in which the pick-up sensor is arranged. Due to the support with the retaining ring 9 the pick-up sensor 7 is supported in the sensor chamber 15 to be rotatably movable. In this connection, it can rotate around a rotation axis that is not shown.

The sensor chamber 15 is connected to the outside 8 of the housing via several free spaces 16. Shown are three free spaces 16. Each free space 16 is formed as a channel extending radially to the rotation axis of the pick-up sensor 7. Each free space 16 has a relatively large cross-section. In a direction tangentially to the pick-up sensor 7, this cross-section has an extension, which corresponds to at least 25% of the diameter of the pick-up sensor 7 or the sensor chamber 15. In the present embodiment, it is even approximately 50%. Each cross-section of each recess 16 has an extension in parallel to the rotation axis of the pick-up sensor 7, which corresponds to at least 25% of the extension tangentially to the pick-up sensor. Thus, the free spaces 16 have a relatively large cross-section. A contamination can enter the sensor chamber 15 through this cross-section. Due to the large cross-section, however, such a contamination will not remain in the sensor chamber 15 for a long time, but will get out of there exactly as fast as it came in. A certain basic contamination in the sensor chamber 15 is acceptable. However, no dirt accumulations will occur, which can no longer escape and thus damage the sensor or the unit during a movement of the pick-up sensor.

Figure 2:
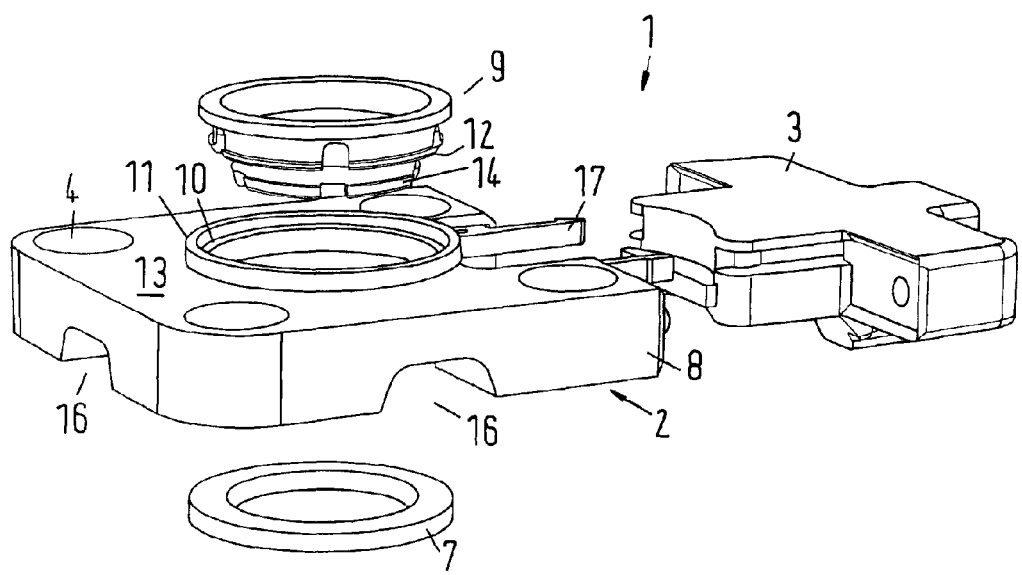

As can be seen particularly from FIGS. 2, 3 and 5, the unit 3 is connected to the housing 2 by means of a snap connection. The snap connection comprises three snap hooks 17, which engage in corresponding recesses at the unit 3, where they can lock. The unit 3 comprises openings 19, through which a tool can be inserted to bend the snap hooks 17, so that they are released from the unit 3, and the unit 3 can be pulled off from the housing 2. These openings 19 are arranged on a side of the unit 3 facing away from the housing 2, so that they are also accessible, when the steering angle sensor 1 is mounted on the steering unit.

The retaining ring 9 still has radially inwardly projecting fingers 20 in the form of spring fingers. When the steering handwheel shaft 6 is mounted, these fingers 20 engage a toothing 21 on the steering handwheel shaft 6. This toothing 21 engages a corresponding counter-toothing 22 on the steering unit 5. By means of these fingers 20, the retaining ring 9 is unrotatably connected to the steering handwheel shaft 6, so that the rotation of the steering handwheel shaft 6 is transferred to the retaining ring 9 by means of a form-fit. The retaining ring 9 then transfers this rotary movement to the pick-up sensor 7, which is arranged on the retaining ring 9 with a sufficient frictional fit.

As can be seen, particularly from FIGS. 4 and 5, the unit 3 projects with an extension 22 into the sensor chamber 15, so that a magnetic sensor arranged in the unit 3 can be located very close to the pick-up sensor 7 and is also able to detect magnetic fields in the axial direction (in relation to the rotation axis of the pick-up sensor 7).

When the steering angle sensor 1 is assembled with the steering unit 5 and the steering handwheel shaft 6, the projection 11 in the housing 23 disappears in the steering handwheel shaft 6. For this purpose a recess is provided here, which is not shown in detail.

In a manner not shown in detail, the pick-up sensor 7 can be connected to a purification device. In the simplest case, this purification device can be formed by a lip that is led along the circumferential wall of the sensor chamber 15. Such a lip can then transport impurities that settle on the circumferential wall of the sensor chamber 15 to the free spaces 16.

When mounting the steering angle sensor 1 on the steering unit 5, the sensor chamber 15 is covered by the steering unit 5, so that some sort of chamber occurs. However, the free spaces 16 remain accessible, so that impurities, for example dust, can penetrate into the sensor chamber 15. Through the free spaces 16, however, the dust can be taken out again just as quickly.

In an embodiment that is not shown, parts of the housing 2 can simply be replaced by spacers, which are located between the steering unit 5 and the steering handwheel shaft 6. In this case, the spacers form the housing 2 or a part of it, and the free spaces 16 become even bigger. It is also possible to connect the unit 3 detachably to the housing 2 in other ways, for example by means of screws.

While the present invention has been illustrated and described with respect to a particular embodiment thereof, it should be appreciated by those of ordinary skill in the art that various modifications to this invention may be made without departing from the spirit and scope of the present.

The invention claimed is:

1. A rotation angle sensor comprising:
    a housing having an exterior and a sensor chamber,
    a pick-up sensor arranged in the sensor chamber, wherein the pick-up sensor is configured to perform rotary movements around a rotation axis, and
    a stationary receiver for interacting with the pick-up sensor,
    wherein the sensor chamber is connected to the exterior via at least one free space, and
    wherein the pick-up sensor is arranged on a retaining ring that rests on an axial bearing surface on the exterior of the housing.

2. The rotation angle sensor according to claim 1, wherein the at least one free space is a channel extending transversely to the rotation axis.

3. The rotation angle sensor according to claim 1, wherein the at least one free space has a cross-section with an extension tangentially to the pick-up sensor amounting to at least 25% of the largest diameter of the pick-up sensor.

4. The rotation angle sensor according to claim 1, wherein the at least one free space has a cross-section with an extension in parallel to the rotation axis amounting to at least 25% of an extension laterally to the rotation axis.

5. The rotation angle sensor according to claim 1, wherein the stationary receiver is arranged in a hermetically enclosed unit, which is detachably connected to the housing.

6. The rotation angle sensor according to claim 5, wherein the hermetically sealed unit is connected to the housing by means of a snap connection.

7. The rotation angle sensor according to claim 6, wherein the snap connection has at least one snap hook, and
    wherein the snap connection may be accessed from a side of the hermetically sealed unit facing away from the housing.

8. The rotation angle sensor according to claim 5, wherein the hermetically sealed unit projects at least partly into the sensor chamber.

9. The rotation angle sensor according to claim 1, wherein the housing has a projection surrounding the axial bearing surface.

10. The rotation angle sensor according to claim 9, wherein the projection has a length in an axial direction equal to a length of a part of the retaining ring resting on the exterior of the axial bearing surface.

11. The rotation angle sensor according to claim 1, wherein the retaining ring has an opening for accommodating a steering handwheel shaft, and
    wherein the retaining ring has at least one spring finger projecting into said opening.

12. The rotation angle sensor according to claim 1, wherein the pick-up sensor is a magnetic pick-up sensor.

13. The rotation angle sensor according to claim 1, wherein a purification device is arranged in the sensor chamber, and
    wherein the purification device can be activated by the pick-up sensor.

* * * * *